May 25, 1943.    C. F. KRAMER    2,319,869
WINDSHIELD
Filed May 10, 1941    2 Sheets-Sheet 1
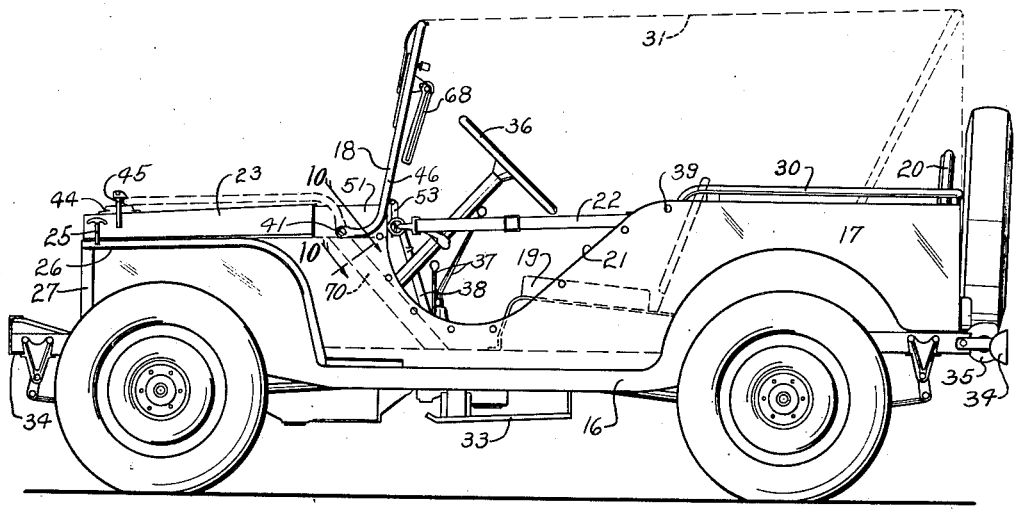
FIG. 1.
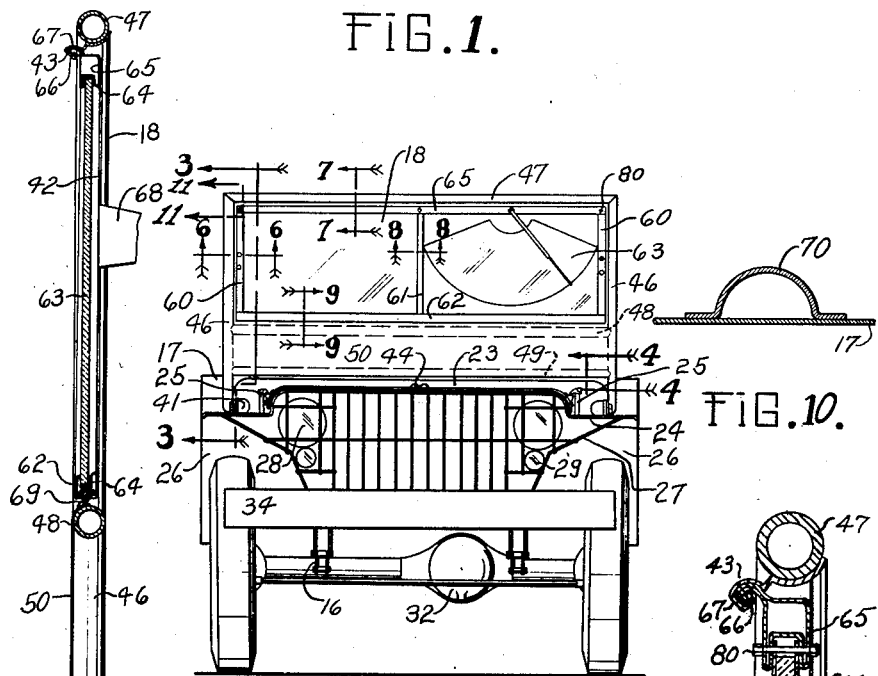
FIG. 2.
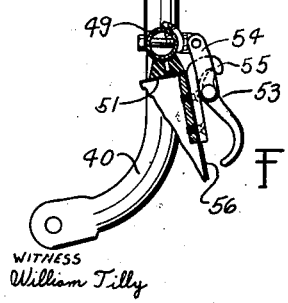
FIG. 3.
FIG. 10.
FIG. 11.
WITNESS
William Tilly
INVENTOR.
Clarence F. Kramer
C. C. McRae and
Robert T. Harris
BY
ATTORNEYS.

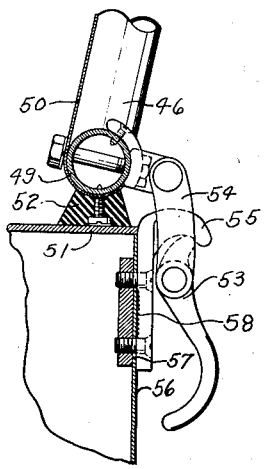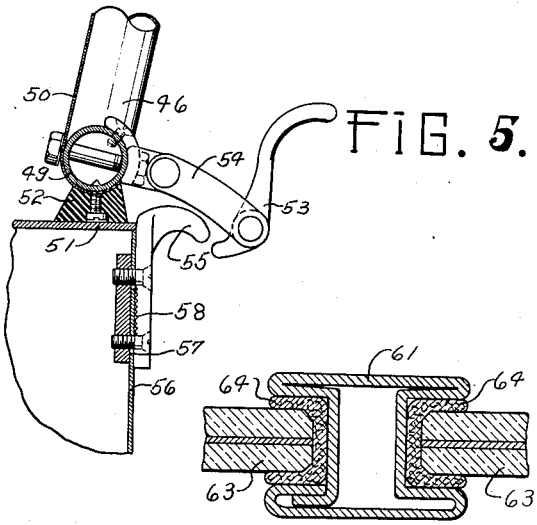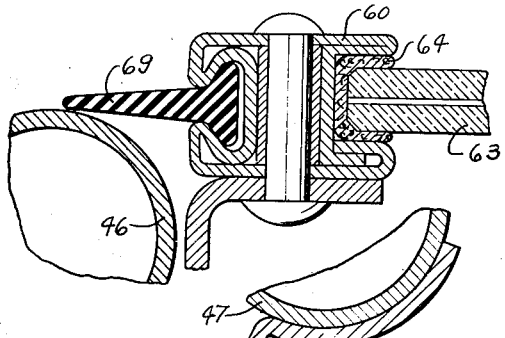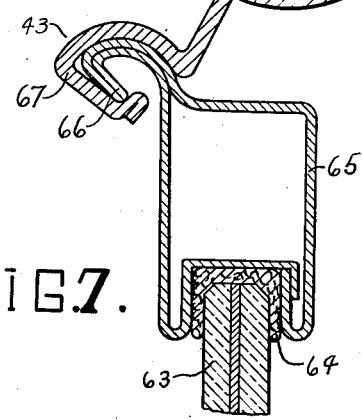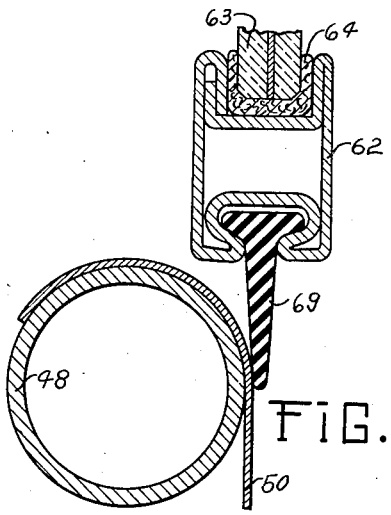

Patented May 25, 1943

2,319,869

UNITED STATES PATENT OFFICE 2,319,869

WINDSHIELD

Clarence F. Kramer, Birmingham, Mich., assignor to Ford Motor Company, Dearborn, Mich., a corporation of Delaware Application May 10, 1941, Serial No. 392,832

5 Claims. (Cl. 296—84)

This invention concerns motor vehicles and, more particularly, a windshield structure to be used on such vehicles.

An object of this invention is to provide a windshield mounting that may readily be folded down. It is a further object to provide a windshield mounting that may be used on motor vehicles subject to extreme stresses on which it has been found that conventional windshield mountings are unsatisfactory due to the fact that these stresses break the windshield glass.

As an example of this invention, I show it in use on a reconnaissance car, which is a type of vehicle used in military service. This car is extremely light, is equipped with a four-wheel drive, and is designed to be operated over rough terrain. As combat units, these cars are subjected to extreme and arduous service and must be expected to operate at the highest possible speed. A further military requirement is that the windshield in use on this car may be folded down on occasion to reduce, as far as possible, the effective silhouette of the vehicle. This is necessary so that the vehicle may escape detection in certain cases.

While folding windshields are old, it has been found that the one most generally used, i. e., that in which there is a rigid vertical supporting frame hinged to the body at its base, is unsatisfactory. Such windshields have been tried, but it is found that in use the strains to which the body of the vehicle is subjected are so severe that the glass carried by the windshield supporting member is continually broken and requires replacement. It has further been found that this rigid construction is unsatisfactory when operating in a country where the windshield may be struck by trees or overhanging objects in that the hinge may become jammed or the entire windshield structure broken off. Still further, it has been found that the conventional glass frames used in such windshields are unsatisfactory as they are too rigid. I have found that it is necessary that the entire construction be resilient in the highest degree, not only to maintain it in the required position, but also to insure that the glass carried by it will not be broken under the severe shocks to which it is subjected.

Accordingly, the windshield-supporting structure shown herein has been evolved. To avoid these difficulties with respect to the windshield-supporting frame, I provide a support which in its upright position rests on the top of the car cowling. This support has two arms that extend from it forwardly and downwardly from this point of contact to pivot points on either side of the car. It is thus apparent that when an object strikes this windshield-supporting member from the front, the support acts as a lever having a fulcrum at the point of contact with the cowling and tending to push the pivot points forwardly. To counter this, I provide struts on the interior of the body that lead from the pivot points to the body floor frame. Furthermore, I provide highly resilient means between the point of contact between the support and the body with the result that such forces are largely cushioned even before being distributed by the components described.

To permit the windshield to be lowered, I provide a center cushion block forwardly of the windshield and substantially on the longitudinal center line of the motor vehicle. When the windshield is folded down, the upper bar of the supporting member rests against this cushion block. It thus has a three-point support from the two pivot points and this cushion block, and it is found that any warpage or weaving of the chassis during the use of the vehicle is not transmitted to the glass and the latter is protected from breakage.

I further find that the windshield frame itself must be made highly resilient, and, accordingly, I have evolved such a frame, having a relatively rigid lower portion adapted to receive the lower edge and sides of the glass and a lighter upper portion attached to said lower portion and holding the glass in position. This frame has a center bar to reduce the area of strain and is of such construction that it may flex slightly under stress, not occasioning any damage to the glass therein.

With these and other objects in view, my invention consists in the arrangement, construction and combination of the various parts of my improved device, described in the specification, claimed in my claims and illustrated in the accompanying drawings in which:

Figure 1 represents a side elevation of the motor vehicle.

Figure 2 is a front elevation thereof.

Figure 3 is a sectional view on an enlarged scale taken on the line 3—3 of Figure 2.

Figures 4 and 5 are sectional views on an enlarged scale taken on the line 4—4 of Figure 2 and showing the operation of the toggle latch.

Figures 6 to 9, inclusive, are sectional views on an enlarged scale taken on the lines 6—6, 7—7, 8—8 and 9—9, respectively, of Figure 2.

Figure 10 is a sectional view on an enlarged scale taken on the line 10—10 of Figure 1.

Figure 11 is a sectional view on an enlarged scale taken on the line 11—11 of Figure 1.

Referring now to Figure 1, a motor vehicle of the type known as a reconnaissance car is shown which has a chassis 16, a body 17 and a windshield 18.

The body is equipped with a front seat 19 and a rear seat 20; and, instead of having the customary doors, has the cutaway portions 21 and detachable safety straps 22. Snap fasteners 39 are placed about the opening 21 and a protective curtain may be fastened there if desired.

Figure 2 shows that the hood portion 23 is broad and flat and is held down against a continuous front bar 24 by suitable holddown clamps 25. The front bar 24 also acts as a support for the fenders 26 and the brush screen 27. Behind the brush screen and protected thereby are the head lamps 28 and the black-out lamps 29.

The rearward portion of the tonneau is surrounded by a removable handrail 30, which may be erected as shown by dotted lines in Figure 1 to form a support for the top 31.

In the particular vehicle shown, a four-wheel drive is employed to make its use feasible over rough terrain and a selective transmission and transfer case is used. The forward differential is shown at 32 and a skid to protect the running gear is shown at 33. Bumpers 34 are installed in the front and rear; that in the rear being made in two parts to permit the installation of a trailer hook 35. Also included are the usual steering wheel 36, the transfer and transmission controls 37 and the hand brake 38.

Referring now to the construction of the windshield and its mounting that form the principal part of this invention, it will be seen in Figure 3 that this consists principally of a supporting frame 40 that is pivoted on the body at 41 and a windshield panel 42 that is pivoted in the frame as at 43. The supporting frame is shown in the upright position in full line in Figure 1 and in its lowered position in dotted line. When in the latter, it rests against a buffer block 44 and is held down by a suitable clamp 45.

The supporting frame is constructed of welded tubing, there being two side bars 46, a top bar 47, an intermediate bar 48 and a bottom bar 49. The lower ends of the side bars 46 are formed to fit the pivot pins 41 secured to the body. A metal sheet 50 is secured between the intermediate and bottom bars forming a shield. The bottom bar 49 is designed to co-operate with the body cowling 51; and, as best shown in Figures 4 and 5, is provided with a heavy resilient cushion 52 bearing on this cowling. Toggle clamp assemblies 53, the toggle link 54 of which is mounted on the bottom bar of the supporting frame, and the hook 55 on the instrument panel 56 secure the supporting member in its upright position. It has been found desirable to allow some latitude of adjustment in this clamp so slots 57 are provided in the instrument panel 56 and the back face of the hook is toothed as at 58 in order that the position of the hook 55 may be adjusted and maintained at any desirable point.

The windshield panel 42 comprises the two side members 60, a center member 61 and a bottom member 62, all of which are welded together in the form shown. The glass panes 63 that are here shown to be of the laminated safety-glass type are then slipped into place, their edges being protected by a suitable cushioning material 64. The top member 65 is then fitted into place and bolted. Figure 11 shows how the flanges of the top member 65 overlie the flanges of the side member 60 and all four flanges are traversed by bolt 80, the cushioning material 64 being omitted at the mating area on the top member to permit the side member to be received therein. As shown in Figure 7, this top member is bent to form a hinge hook 66 that is designed to co-operate with a complementary hinge hook 67 secured to the top bar 47 of the supporting frame. In assembling the panel in the supporting frame, the hook 66 slides endways into the hook 67. The length of hook 67 is somewhat greater than that of hook 66 and, after the latter is in position, the extending ends of 67 are bent inwardly, thereby locking the panel securely in place. The usual windshield adjuster 68 permits the windshield panel to be held in any desired position.

As shown in the sections in Figures 6 to 9, the side and bottom members 60 and 62 of the panel are channeled on their outer surfaces to receive a suitable weather-strip 69.

Reference to Figure 1 will show that the pivot point 41 is supported by a strut 70, shown in dotted line therein and in section in Figure 10, which strut runs from the pivot point to the frame of the vehicle.

It will be noted that when the windshield is in the erect position shown in Figure 1, forces directed against it from the front will be divided between the pivot points and the top of the cowling. As the pivot point is placed forwardly of the cowling supports, it is apparent that the pivots would tend to be pushed forwardly as the force tended to pivot the supporting frame about the fulcrum formed by the cowling supports. However, the pivot point is reinforced by the strut referred to above, directly connected to the frame of the vehicle. It has been found that by using this construction the resultant windshield is much stronger than when the usual vertical-bar structure is used.

In addition, when such conventional construction is used, it has been found that the glass in the windshield panel has a tendency to break under slight shock. I have found that when the windshield-supporting frame is relatively flexibly mounted as it is here, and some flexibility is allowed in the windshield panel itself, the window glass will not be harmed even during the most severe service. Thus, while the windshield panel frame is welded at the bottom corners, the top is of somewhat thinner metal and may be readily removed to replace broken glass panes. Moreover, adequate cushioning is provided around all edges of the glass pane, allowing still further movement. As a result, the glass seems to accommodate itself to even the most severe warping strain of the panel frame or of the supporting frame.

Further, when the windshield is in the windshield-supporting frame in the down position, as shown in dotted line in Figure 1, there is a three-point support between the pivots 41 and the front buffer block 44. I find that this method of support allows the supporting member to warp considerably without either straining it or breaking the glass contained in it. When the car is in operation over rough ground, the warping of the supporting frame in the lowered position is quite evident; and while in prior constructions in which a rigid supporting frame and rigid panel were used the glass broke readily, now it is found that the glass will survive even the sharpest shocks.

A further consideration which enters into the construction of cars of this type is that for military purposes the lowest possible silhouette is desirable. It is for this reason that the entire windshield frame may be lowered. In the conventional contruction, a heavy hinge is required at the base of the windshield to permit this. Such a hinge requires considerable bearing surface and it has been found that the warping in such usage of the vehicle is sufficient to make this hinge work hard or to disable it entirely. In my construction, on the contrary, the hinge is a mere pivot point and the forces on the windshield are not transmitted solely to it but to the pivot point and to the cowling support noted previously. Again, this semiresilient construction not only preserves the glass but also seems to give a much stronger contruction of the frame as a whole.

I have thus devised a windshield construction which, though particularly desirable for vehicles of the type shown, is suitable for all vehicles that are subjected to extreme driving conditions. This construction gives a windshield which may be used either in an erect or lowered position, and in either position the effect of warpage strain on the frame is not transmitted to the glass pane.

I have further devised a windshield panel that is in itself flexible enough to carry the glass without injuring it under such shock and which is rigid enough to provide the necessary support and protection.

I have still further devised a method of adjustment to a holddown clamp for the windshield and its mode of application to the vehicle.

I claim as my invention:

1. In a motor vehicle, in combination, a chassis, a body, pivot pins on said body, struts leading between said pivot pins and said chassis, a windshield supporting frame pivoted on said pivot pins, a bearing on said body spaced rearwardly and above said pivot pins and a complementary bearing surface on said windshield frame.

2. In a motor vehicle, in combination, a body having a cowling and a transverse panel, pivot points on the outer surface of said body spaced forwardly of said transverse panel and below the upper surface of said cowling, a windshield-supporting member pivoted on said pivot points and having a transverse bearing member co-operating with said cowling and in substantial alignment with this transverse panel, and locking means between said windshield-supporting member and said body.

3. The structure of claim 2, which is further characterized in that said locking means comprises a toggle clamp, the engaging parts of said toggle clamp being relatively adjustable one to the other one part of said toggle clamp affixed to said windshield-supporting member, the other part thereof being affixed to said panel.

4. In a motor vehicle, in combination, a cowling having a substantially rectangular section, a hood hingedly secured to said cowling and extending forwardly therefrom, a windshield-supporting frame pivoted thereto, said frame comprising two integral L shaped side bars having transverse crossbars secured therebetween, pivot pins on the outer surfaces of the sides of said cowling spaced from the top surface of said cowling a distance slightly less than the length of the short leg of said L, said side bars being pivoted thereto at the ends of said legs, said windshield-supporting frame in one position of adjustment being substantially erect and the lower crossbar thereof engaging the horizontal surface of said cowling, in another position of adjustment, said frame being substantially horizontal and lying in close proximity with the horizontal surface of said hood.

5. In a motor vehicle, in combination, a body having a cowling of substantially rectangular section, a transverse panel at the rear end of said cowling, pivot pins on the outer surface of said cowling spaced forwardly of said panel and a substantial distance below the top surface of said cowling, a windshield-supporting frame comprising an integral L shaped rail at each side thereof and having a plurality of cross members therebetween, the short legs of said L extending forwardly and being pivoted at their forward ends on said pivot pins, the lower of said transverse bars in one position of said frame being disposed substantially above said panel and in continuous bearing engagement with said cowling, another of said transverse bars in another position of adjustment in which said frame is substantially parallel with the top surface of said cowling being removably secured to said cowling.

CLARENCE F. KRAMER.